United States Patent [19]
Charles et al.

[11] 3,982,068
[45] Sept. 21, 1976

[54] NOVEL TARGET FOR AN ULTRASONIC WAVE CAMERA AND DEVICES INCORPORATING SUCH A TARGET

[75] Inventors: Daniel Charles; Lucien Guyot; Jean Philippe Reboul; Guy Moiroud, all of Paris, France

[73] Assignee: Thomson-CSF, Paris, France

[22] Filed: Apr. 15, 1975

[21] Appl. No.: 568,315

[30] Foreign Application Priority Data
Apr. 19, 1974 France ................ 74.13765

[52] U.S. Cl. ................ 178/7.2; 178/DIG. 18; 313/369; 313/388
[51] Int. Cl.² .............. H04N 5/30; H01J 31/49
[58] Field of Search ............ 178/7.2, DIG. 18; 313/369, 388; 73/67.5 R; 340/5 MP; 250/330

[56] References Cited
UNITED STATES PATENTS

| | | | |
|---|---|---|---|
| 3,054,917 | 9/1962 | Eberhardt | 313/388 |
| 3,236,944 | 2/1966 | Jacobs | 178/DIG. 18 |
| 3,495,117 | 2/1970 | McNally | 313/388 |
| 3,599,477 | 8/1971 | Cohen et al. | 73/67.5 R |
| 3,774,043 | 11/1973 | Le Carvennec | 250/330 |
| 3,837,423 | 9/1974 | Mailer | 340/5 MP |

*Primary Examiner*—Robert L. Griffin
*Assistant Examiner*—Mitchell Saffian
*Attorney, Agent, or Firm*—Roland Plottel

[57] ABSTRACT

A target for ultrasonic camera comprising, applied to a substrate, a pyroelectric retina covered, in the present example, with a layer which absorbs incident ultrasonic waves; the temperature rise due to said absorption produces in the retina a charge relief read out by means which depend upon the selected device, for example an electron beam as in the case of the known pyroelectric targets.

10 Claims, 5 Drawing Figures

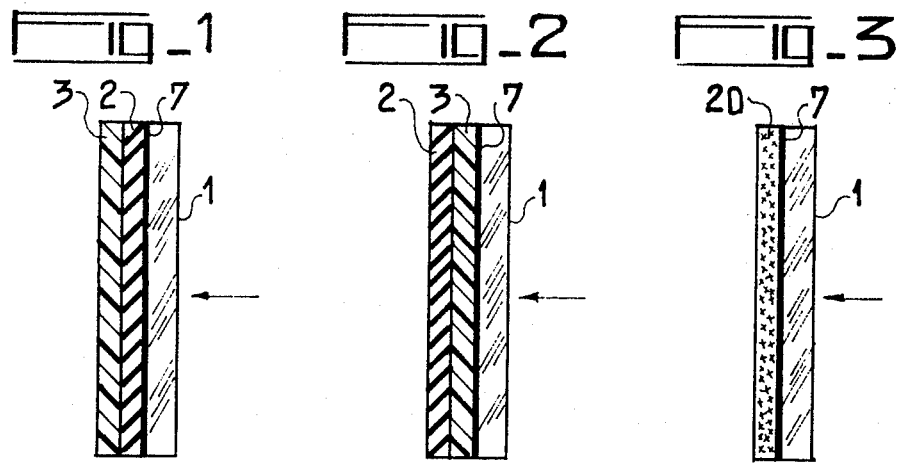
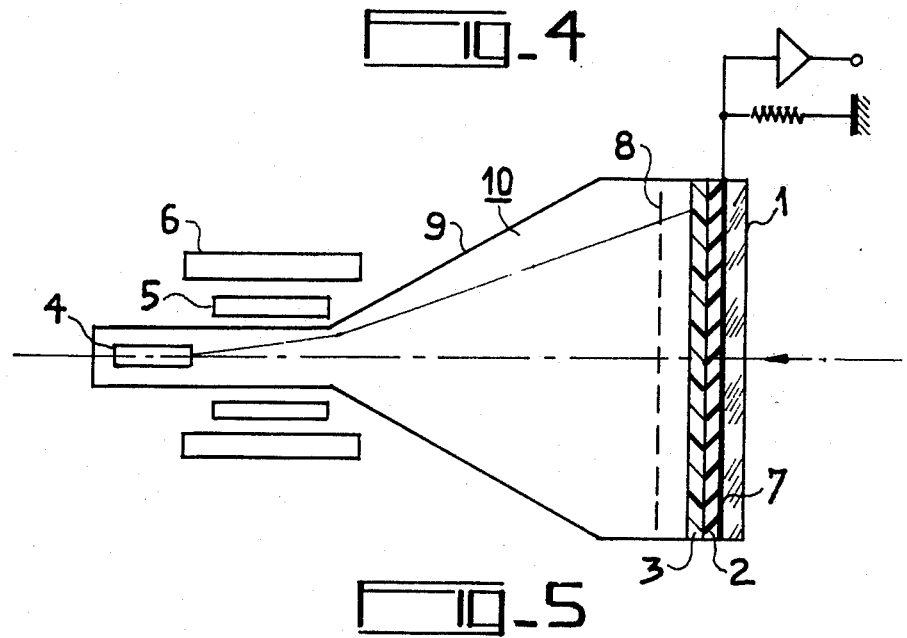
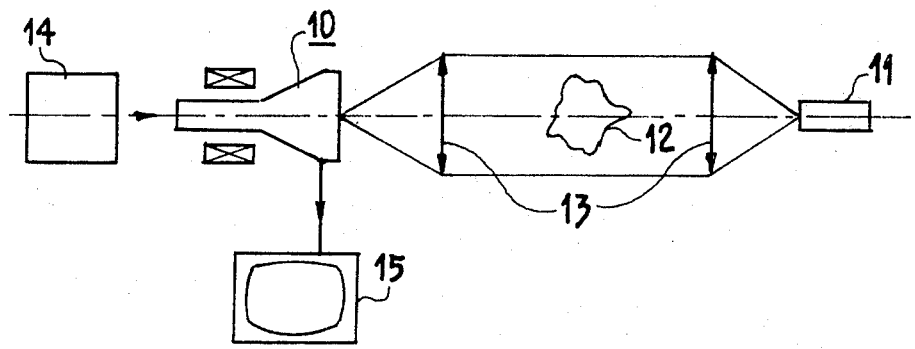

NOVEL TARGET FOR AN ULTRASONIC WAVE CAMERA AND DEVICES INCORPORATING SUCH A TARGET

The present invention relates to a target for ultrasonic wave camera devices, that is to say camera devices utilising ultrasonic waves passing from the object which is to be displayed towards the target. The target in accordance with the invention incorporates an element or retina exhibiting pyroelectric characteristics under the conditions which will be described hereinafter.

The invention is applicable furthermore to all devices equipped with such a target. The display of objects in optically absorptive or scattering media in which the transmission of optical images is not possible, has hitherto (in the prior art) had recourse to various replacement techniques. One of these utilises the ultrasonic waves emitted by the object or transmitted or reflected by it when said waves come from an outside source. In this context, reference can be made to "Ultrasonic Microscope" by Sokoloff, an article which appeared in the reports of the Soviet Academy of Sciences, volume 64, page 333, 1949 and to United Kingdom Pat. No. 841 025 and U.S. Pat. Nos. 3 325 777 and 3 600 936.

All these references describe piezoelectric targets which are exposed to the incident ultrasonic waves, under the effect of which latter, due to their piezoelectric nature, said targets develop an electrical charge relief forming an image of the object from which said waves emanate. It is stated that this relief is read out by a process of point by point scanning of the target using the electron beam of a cathode ray tube in which the target is installed. A piezoelectric target of this kind takes the form of a monocrystalline or polycrystalline wafer of a piezoelectric substance, closing off one end of the cathode ray tube in question. The thickness of said wafer is of the order of $\lambda/2$, where $\lambda$ designates the wavelength of the ultrasonic radiation employed, whilst its diameter is for example in the order of 30 $\lambda$ in order to provide an adequate resolving power, in the case where a wavelength of 1.5 mm is used, this corresponding to waves at a frequency of 1 MHz in a medium in which the velocity of propagation of said waves is 1500 m/s.

These dimensions are generally incompatible with the mechanical strength which the target must have in order to resist the pressure difference prevailing across its two faces. This is why, evidently, these targets have only been developed to a restricted extent despite their very high sensitivity, around $10^{-4}$ mW/cm$^2$, and their resolving power which is of the order of the wavelength $\lambda$ and satisfactory for the values given hereinbefore.

Attempts have been made to overcome this difficulty by utilising a single piezoelectric element of small dimensions mechanically scanning the relevant field, but in that case the read-out time is lengthy, of the order of several seconds, or by using a network of point type piezoelectric detectors in which case a complex target structure has to be accepted against a limited resolving power.

The present applicants have conceived a novel target which is not open to the drawbacks referred to earlier. This target is one of the objects of the invention which latter also takes as its object the devices incorporating such targets. The invention will be better understood from a consideration of the following description and the attached figures in which:

FIGS. 1, 2 and 3 illustrate schematical sectional views of three variant embodiments of a target in accordance with the invention, on its substrate;

FIG. 4 is a schematic view of a device equipped with a target in accordance with FIG. 1; and FIG. 5 is a schematic view of a camera system incorporating a device in accordance with FIG. 4.

FIG. 1 schematically illustrates a target in accordance with the invention in section.

On a substrate 1 which is permeable to ultrasonic waves, the latter illustrated by the arrow and coming from the object, there is applied a pyroelectric retina 2 of prior art kind. For further information regarding these retinas, the reader is referred to the U.S. patent application Ser. No. 243 210 (U.S. Pat. No. 3 774 043). The substrate 1 is made of a material having low thermal conductivity and must provide good coupling with the medium through which the incident ultrasonic waves are propagating. Such a material is for example glass if the medium in question is water. The retina 2 is generally stuck to the substrate 1, the latter being several millimeters in thickness.

In the embodiment of FIG. 1, the target comprises furthermore a layer 3 of electrically insulating kind made of a material which is capable of absorbing incident ultrasonic waves. The heat resulting from this absorption spreads through the pyroelectric retina 2 and there forms a thermal image of the object. This thermal image is itself converted into an electrical charge image within the body of the retina due to the pyroelectric nature of the latter, this in the manner explained in detail in the aforementioned Patent Application. The quantity of electrical charges involved at each point is broadly proportional to the ultrasonic energy received by said point. This image is read out by some suitable means or other.

An example of such means will be described hereinafter.

The pyroelectric retina 2 consists, for example, of a plate of monocrystalline glycocol sulphate some few hundreds of microns in thickness, when operating in water at ultrasonic wavelengths having a frequency of 1 MHz; the wavelength in this case is 1.5 mm. The absorptive layer 3 is constituted by a deposit of an electrically insulating substance, for example antimony trisulphide, $Sb_2S_3$, produced upon the retina in the form of a porous layer created for example by vapourisation under vacuum; its thickness is deliberately less than that of the retina; under the indicated conditions the diameter of a round retina should be in the order of a decimeter in order to provide an adequate resolving power. In a variant of the foregoing embodiment (FIG. 2) the layer 3 is applied to the substrate 1 between the latter and the retina 2.

In the examples described earlier, the target is made up of two elements 2 and 3 applied to the substrate 1. In another variant embodiment of the invention, the target is reduced to a single element 20 applied to the substrate 1, in the manner shown in section in FIG. 3, this element being made of material which is both pyrolitic and possesses the capability to absorb ultrasonic waves. Materials of this kind are composite materials made up of a large number of small crystals of a pyroelectric material embedded in a substance which absorbs acoustic energy. A target of this kind is stuck to the substrate in the manner shown in the variant embodiment of FIG. 1. In another embodiment of the variant shown in FIG. 3, the absorption is achieved quite simply by the formation of spaces between the crystals.

The resin is produced in the form of crystalline grains of a pyroelectric material stuck to the substrate 1 and separated from one another by interstices. In both forms of this embodiment, the retina is illustrated by the rectangle of FIG. 3, which is covered with crosses. In these three figures, the reference 7 signifies the signal plate which is electrically conductive and serves to pick off the electrical signal produced by the target.

In the foregoing, a target structure in accordance with the invention, which makes it possible to convert the incident acoustic image into a thermal and electric image, has been described. It now remains to define the means used to read out this kind of image. In the following, by way of example, one of the devices utilised in accordance with the invention for that purpose has been described, this device employing an electron beam which scans the target at the side opposite to that which is in contact with the substrate, as in the case of the pyroelectric targets of prior art kind which have been described in the cited Patent Application. Before describing this device, it is worth pointing out that in the case of the targets in accordance with the present invention the presence of the absorptive layer, if there is one at all (FIGS. 1 and 2), necessitates a special choice of the material of which it is made. This layer, in other words, behaves at any point therein as a capacitor arranged in series with that of the point located opposite it on the retina. In order not to disturb read-out, this capacitor must have a capacitance which is large compared with the corresponding retinal capacitance. This condition is achieved either by choosing a material for the absorptive layer 3, which has high electrical permittivity or by creating absorptive layers of very small thickness, or by combining both methods. A resin filled with a metallic powder can be utilised to constitute this layer.

FIG. 4 provides a schematic sectional view of the device in question, in the case of a target made up of two separate layers 2 and 3. The substrate 1 constitutes the input window, receiving the acoustic waves, of the cathode ray tube 10 the rest of whose envelope is marked 9. The electron-gun is marked by the reference 4 whilst the references 5 and 6 respectively designate the beam deflection and focussing systems, the beam being schematically indicated in one of its positions by the broken line inside the envelope. At the top right of FIG. 4 the circuit (not referenced) responsible for picking off the electrical read out signal has been shown, whilst 8 represents a field grid.

The implementation of the device shown in the figure may nevertheless differ somewhat, as far as the sequence of the various operations is concerned, from that disclosed in the aforesaid Application, especially in the case where the system is operated by transmission of ultrasonic energy through the object which is to be displayed, as shown in the diagram inn FIG. 5 where the elements of FIG. 4 retain the same references. The ultrasonic source is illustrated at 11 and the object to be displayed at 12; the reference 13 illustrates the system, similar to an optical system, responsible for focussing the image of the object 12 on the target of the cathode ray tube 10 in the case of a beam delimited by the extreme rays represented by the broken lines; 14 is the system controlling the cathode ray tube 10, and 15 the display tube.

In a first phase, lasting some tens of milliseconds, the object is exposed to the beam of ultrasonic waves coming from the source 11. Once this phase has been completed, read out of said image is carried out by scanning the target using the slow electron beam of the cathode ray tube, the beam being enabled by the system 14 during the time required for read-out, under conditions similar to those disclosed in the aforesaid Application. Then, the target is allowed to cool for some tens of milliseconds, the cooling being followed by renewed scanning of the target in order to restore the initial charge conditions.

This kind of sequence of operations makes it possible to avoid the need for the shutters usually associated with pyroelectric targets in order to enable the latter to cool between two successive beam passes, and renewal of the signal. In the case where objects are being detected by reflection and not transmission of the ultrasonic waves, this sequence makes it possible, on the other hand, using a suitably synchronised shutter, to apply to the target only the echoes furnished by these objects, to the exclusion of those furnished by the various obstacles which may be located at different ranges within the field of scan between source and object. It also makes it possible, by adjustment of the phases of opening and closing of the shutter, to successively display sections located at given depths within the object (tomography).

In another application of the same device, the beam of ultrasonic waves is permanently maintained, however. In this case, only the mobile objects appear, in the manner well known from the technique of thermal television camera work where a stationary object results in the disapperance of the signal.

The target of the invention and the devices to which it is fitted, such as that described hereinbefor by way of example, are aperiodic in nature, that is to say are independent of the frequency of the acoustic waves involved or at any rate depend very little on said frequency, because of the thermal conversion of the incident energy which take place in them.

They also integrate the received energy during the whole of the time for which the object is exposed to the source radiation, as long as said time does not exceed that after which the spatial resolution of the target is cancelled because of the diffusion of heat through it.

Finally, the ultrasonic image formed of the object by a device of the kind described in FIG. 4, is produced in a very short time, in contrast to the case with the ultrasonic devices utilising other known modes of read-out such as liquid crystal devices; in this context, reference may be made to the article "Mapping ultrasonic fields with cholesteric liquid crystals" by B. D. Cook and R. E. Werchan, Ultrasonics, Apr. 1971, pages 101 and 102.

The resolving power is the same as that of all devices which utilise ultrasonics; it is of the order of magnitude of the wavelength of the ultrasonic waves employed.

The invention has various applications such as the display of objects under water for detection purposes of for work in obscure water in harbours, or for the examination of parts of the human body or foetal observations in the medical field, as well as in the non-destructive testing of materials in the industrial sector. In all sub-marine applications, short-range viewing has to be accepted because of the high attenuation experienced by ultrasonic waves in propagating through this medium.

In the foregoing, with the help of FIG. 4 one of the devices in accordance with the invention has been descirbed, in which the read out of the target is effected by means of an electrons beam. This device giben by way of example is not the only one capable of realisation using the targets of the invention as is depicted in FIGS. 1 to 3. All equivalent devices utilising such a target fall within the scope of the invention.

What is claimed is:

1. A target for an ultrasonic camera device, characterised in that it comprises, a substrate which is exposed to incident ultrasonic waves, and applied to said substrate a retina made of a pyroelectric material and means for transforming the energy of said ultrasonic waves into thermal energy transmitted to said retina.

2. A target as claimed in claim 1, characterised in that said pyroelectric material is glycocol sulphate.

3. A target as claimed in claim 1, characterised in that it is constituted by a granular layer of crystals of a pyroelectric material stuck to said substrate.

4. An ultrasonic camera device characterised in that it comprises within an evacuated envelope a target in accordance with claim 1; means for producing an electron beam; means for causing said beam to scan said target point by point, and means for reading out the quantity of charges deposited by said beam at each of said points in passing over same, said quantity constituting the image signal of said point.

5. A target as claimed in claim 1, characterised in that said means consist of a layer of a material which absorbs said ultrasonic waves and is applied to said retina at the side opposite to said substrate.

6. A target as claimed in claim 5, characterised in that said retina consists of a monocrystalline plate of glycocol sulphate; and in that said layer is constituted by a porous antimony trisulphide, $Sb_2S_3$.

7. A target as claimed in claim 1, characterised in that said means consist of a layer of a material which absorbs said ultrasonic waves and is applied to said substrate beneath said retina.

8. A target as claimed in claim 7, characterised in that said retina consists of a monocrystalline plate of glycocol sulphate; and in that said layer is constituted by a porous antimony.

9. A target as claimed in claim 1, characterised in that said means consist of a material which absorbs ultrasonic waves mixed with said pyroelectric material retina.

10. A target as claimed in claim 9, characterised in that said retina consists of particles of a pyroelectric substance embedded in a resin which resin is mixed with a metal powder.

* * * * *